W. R. SIMONS.
BRICK WALL CONSTRUCTION.
APPLICATION FILED APR. 14, 1919.
1,323,110.
Patented Nov. 25, 1919.
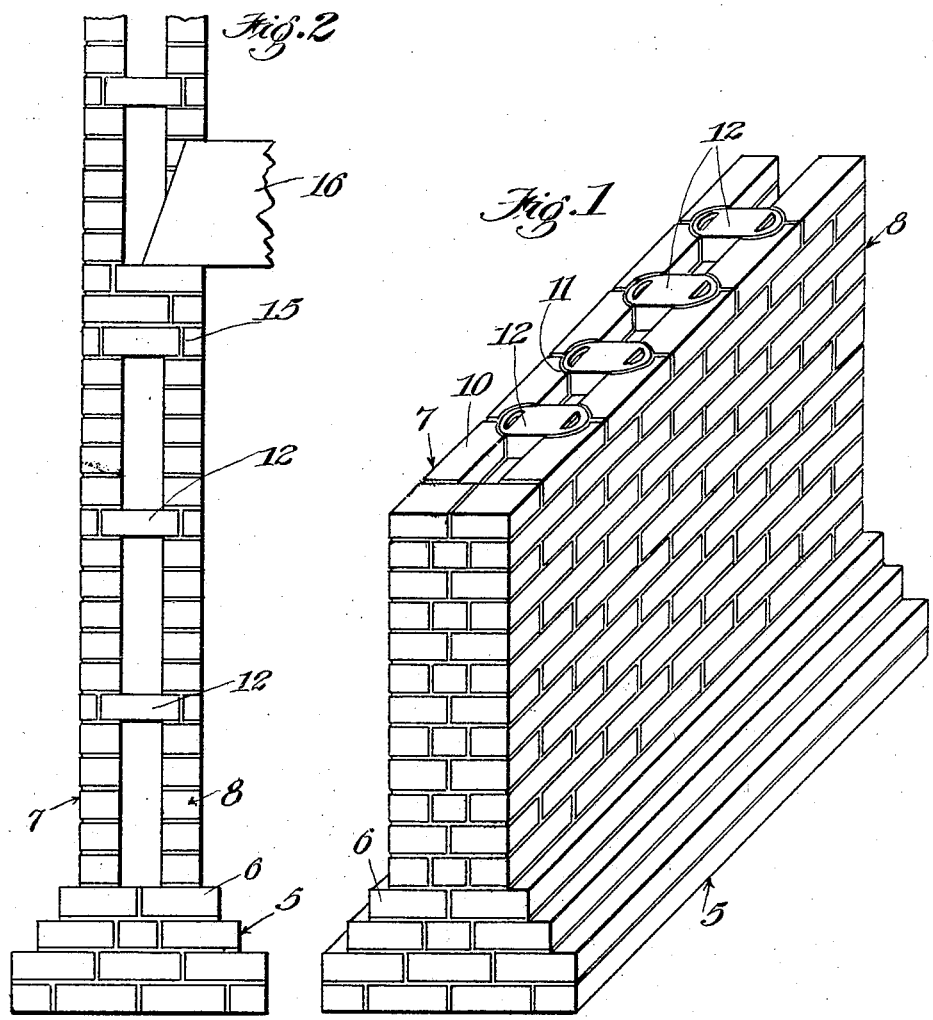
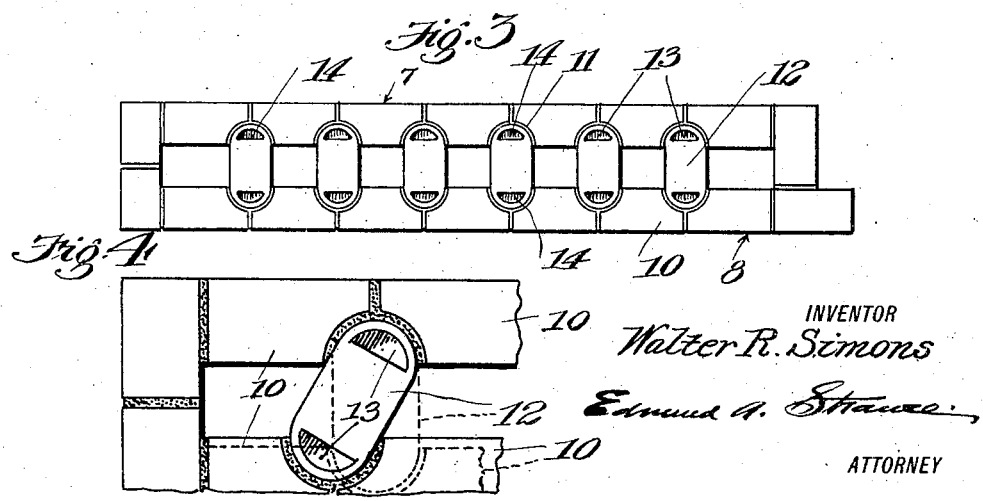
INVENTOR
Walter R. Simons
Edmund A. Strauss
ATTORNEY

UNITED STATES PATENT OFFICE.

WALTER R. SIMONS, OF PASADENA, CALIFORNIA.

BRICK-WALL CONSTRUCTION.

1,323,110. Specification of Letters Patent. Patented Nov. 25, 1919.

Application filed April 14, 1919. Serial No. 289,816.

*To all whom it may concern:*

Be it known that I, WALTER R. SIMONS, a citizen of the United States, residing at Pasadena, in the county of Los Angeles, State of California, have invented new and useful Improvements in Brick-Wall Construction, of which the following is a specification.

My invention pertains more particularly to a hollow brick wall construction, and a novel bonding means therefor.

An important object of my invention is to provide a novel bonding or tying means for hollow brick walls, whereby the outer and inner faces of the walls are securely held together against movement.

Another object of my invention is to provide a novel bonding means for hollow brick walls, whereby walls of less than standard thickness may be constructed without the necessity of cutting the brick or otherwise defacing the walls.

Another object of my invention is to provide a novel hollow brick wall construction in which, soil, vent and other piping may be readily and conveniently mounted and secured therein.

A further object of my invention is to provide a novel form of bonding or tying means for hollow brick wall structures, whereby a greater bearing surface between the bonding means and walls is attained.

A still further object is to provide a novel form of bonding brick having depressions on one face thereof to prevent shifting or movement of the brick courses.

Other objects and advantages, will be apparent from the following description, reference being had to the accompanying drawings forming a part hereof, in which:

Figure 1 is a perspective view of a hollow brick wall construction in accordance with my invention.

Fig. 2 is a side elevation of a hollow brick wall illustrating the bonding means and bearing courses for beams.

Fig. 3 is a plan view of my wall construction.

Fig. 4 is a plan view of my wall construction illustrating the method of laying the bonding courses to form a wall of less thickness than a standard size.

Referring more particularly to the drawings, 5 designates a wall footing formed of any suitable material, and is of solid formation as clearly shown in Figs. 1 and 2 of the drawing.

Laid upon the upper face 6 of the footing are inner and outer facing brick walls 7 and 8, disposed in parallel relation to each other. At intervals in the construction of these inner and outer facing walls, preferably every sixth course, a bonding or tying course 9 is formed. This bonding course is preferably formed of brick 10 having two of their corners on their inner faces cut away into a curved form as at 11, the two adjacent bricks 10 forming semi-circular recesses 11 when laid end to end in courses.

Connecting the two facing walls 7 and 8 are a plurality of bonding brick 12, a bonding brick being inserted at the adjacent ends of each pair of brick as clearly shown in Figs. 1 and 2 of the drawings. These bonding brick are preferably formed with semi-circular ends 13 which are disposed in the semicircular recesses or openings formed by the bonding brick courses of the outer walls 7 and 8. By rounding the ends of the bonding brick 12, I am enabled to obtain a very much greater bearing surface than with brick having ends of square form. Moreover, by forming the bonding brick with rounded ends, all danger of the bricks chipping or becoming broken in transit is obviated, also by cutting or forming the corners of the bricks forming the bonding courses in the inner and outer walls of the concave form, all danger of breakage or cracking is obviated, the curved cut-away portions being very much stronger than if they were formed of rectangular configuration. The upper face of the bonding brick 12 when laid are provided at two of its ends with cavities 14 for the purpose of forming a stronger bond for the courses which are laid thereon, and also to prevent any shifting movement.

Above the uppermost course of the first story of the wall structure, the wall is laid in a solid manner as clearly shown in Fig. 2 of the drawings, for the purpose of forming a greater and stronger bearing for the floor beams 16 when laid thereon.

In Fig. 4 of the drawing, I have illustrated a method of laying the bonding brick 12 so as to form a hollow wall of less thickness than the standard sizes. When it is desired to construct such a wall, the bonding brick 12 are inclined from a right angled position with respect to the facing walls 7 and 8, so that the space formed by the two inner and outer walls may be decreased in width. The greater the inclination of the bonding brick 12, the less space there will be between the walls.

By this method of construction it will be at once apparent that I could construct hollow brick walls of less thickness than the standard size without cutting the brick or defacing the wall in any manner, also the uniform width of the end joints of the wall will not be disturbed in the least, it being impossible to accomplish such construction with ordinary brick without cutting or defacing.

The hollow spaces formed between the side faces of the bonding bricks 12, may be utilized for installing soil, vent, water, gas and other piping or conduits for electrical wiring without cutting or otherwise defacing the wall in any manner.

What I claim is:

1. A hollow brick wall construction, comprising two walls spaced apart having a plurality of semi-circular recesses, and a plurality of bonding bricks having semi-circular ends connecting said walls, the ends of said bricks fitting in said recesses.

2. A hollow brick wall construction, comprising inner and outer brick walls spaced apart, said walls being formed of several courses of brick laid one upon another, the inner corners of each of said bricks forming the bonding courses of said inner and outer walls being cut away in quadrant form, and a plurality of bonding brick having semi-circular ends connecting said facing walls, the ends of said brick fitting in the semi-circular spaces formed by the bonding brick laid in the bonding courses of the inner and outer facing walls.

3. A hollow brick wall construction, comprising inner and outer walls spaced apart, the opposing faces of said walls provided with a plurality of horizontally disposed rows of semi-circular cavities, and a plurality of bonding brick having semi-circular ends disposed in said semi-circular cavities to tie said walls in rigid relation to each other.

4. A hollow brick wall construction comprising a pair of walls spaced apart, said walls being formed of a plurality of courses of brick, a plurality of courses of brick each having two of their corners cut away in a concaved form, said last named courses being inserted at regular intervals in said pair of walls, and a plurality of bonding brick having rounded ends secured between said walls, the rounded ends of said bricks engaging the recesses formed by the brick in said bonding courses.

In witness that I claim the foregoing I have hereunto subscribed my name this 20th day of March, 1919.

WALTER R. SIMONS.